United States Patent
Li et al.

(10) Patent No.: US 8,699,374 B2
(45) Date of Patent: Apr. 15, 2014

(54) ORTHOGONAL FREQUENCY-DIVISION MULTIPLEXING SYSTEM CAPABLE OF OPTIMIZING CHANNEL ESTIMATION AND METHOD FOR OPTIMIZING CHANNEL ESTIMATION FOR ORTHOGONAL FREQUENCY-DIVISION MULTIPLEXING SYSTEM

(75) Inventors: Chih-Peng Li, Kaohsiung (TW); Wei-Chieh Huang, Hsinchu County (TW); Chin-Liang Wang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 149 days.

(21) Appl. No.: 13/545,760

(22) Filed: Jul. 10, 2012

(65) Prior Publication Data
US 2013/0242768 A1  Sep. 19, 2013

(30) Foreign Application Priority Data

Mar. 15, 2012 (TW) .............................. 101108904 A

(51) Int. Cl.
*H04L 12/28* (2006.01)

(52) U.S. Cl.
USPC .......................................................... 370/252

(58) Field of Classification Search
None
See application file for complete search history.

(56) References Cited

PUBLICATIONS

S. Lu, et al., "A Novel CDD-OFDM Scheme with Pilot-Aided Channel Estimation", IEEE Transactions on Wireless Communications, vol. 8, No. 3, Mar. 2009, pp. 1122-1127.

*Primary Examiner* — John Blanton
(74) *Attorney, Agent, or Firm* — Muncy, Geissler, Olds & Lowe, P.C.

(57) ABSTRACT

The present invention discloses a channel estimation method for an orthogonal frequency-division multiplexing system with cyclic-delay diversity. The method makes pilots have the same amplitude and equally partitions the pilots into a number of pilot groups. In addition, the method equally spaces the pilots of each group in a frequency domain and determines the pilot locations and cyclic-delay coefficient of each pilot group in order to optimize the channel estimation of a receiver. The method can perform the channel estimation by using just one OFDM symbol.

16 Claims, 7 Drawing Sheets

US 8,699,374 B2

ORTHOGONAL FREQUENCY-DIVISION MULTIPLEXING SYSTEM CAPABLE OF OPTIMIZING CHANNEL ESTIMATION AND METHOD FOR OPTIMIZING CHANNEL ESTIMATION FOR ORTHOGONAL FREQUENCY-DIVISION MULTIPLEXING SYSTEM

CROSS-REFERENCE TO RELATED APPLICATION

This application claims the benefit of Taiwan Patent Application No. 101108904, filed on Mar. 15, 2012, in the Taiwan Intellectual Property Office, the disclosure of which is incorporated herein in its entirety by reference.

FIELD OF THE INVENTION

The present invention relates to a communication system, more particularly to an orthogonal frequency division multiplexing system capable of optimizing a channel estimation and a method for optimizing the channel estimation of the orthogonal frequency-division multiplexing system that use a special design of pilots to improve the channel estimation performance.

BACKGROUND OF THE INVENTION

In recent years, the orthogonal frequency division multiplexing (OFDM) system has become a mainstream communication system in the field of digital communications, and the OFDM system can improve the performance of multiple-input multiple-output (MIMO) networks effectively. However, the conventional orthogonal frequency division multiplexing system requires performing the inverse discrete Fourier transform (IDFT) for several times, thus increasing the computing complexity of the system.

A cyclic-delay diversity orthogonal frequency division multiplexing (CCD-OFDM) system provides a method of transmission diversity capable of converting a multiple-input single-output (MISO) channel into a single-input single-output (SISO) channel by simply performing the inverse discrete Fourier transform (IDFT) operation once, and receivers do not require any additional decoder, and thus the CCD-OFDM system provides a better system than the conventional OFDM system.

A method for optimizing the channel estimation performance applied in a cyclic-delay diversity orthogonal frequency division multiplexing system has been disclosed. For example, "A novel CDD-OFDM scheme with pilot-aided channel estimation," published by S. Lu and N. Al-Dhahir in IEEE Trans. Wireless. Comm., vol. 8, no. 3, pp. 1122-1127, March 2009 adopts a design of pilots to improve the channel estimation performance. However, this conventional method requires arranging the pilots in different OFDM symbols, and the quantity of transmitting antennas must be equal to the quantity of OFDM symbols before the effect of improving the channel estimation performance can be achieved, and thus there are many limitations in this application. In addition, this conventional method requires a plurality of OFDM symbols for transmitting the pilots, and receivers have to receive many OFDM symbols to perform the channel estimation, thus resulting in a serious delay of the system.

Therefore, it is an important subject for the present invention to provide an orthogonal frequency division multiplexing system capable of simplifying the computing complexity and overcoming the system delay problem in order to provide a better flexibility of the applications.

SUMMARY OF THE INVENTION

In view of the aforementioned drawbacks of the prior art, it is a primary objective of the present invention to overcome the drawbacks of the prior art by providing an orthogonal frequency division multiplexing system capable of optimizing channel estimation and method for optimizing channel estimation for an orthogonal frequency-division multiplexing system, to optimize the channel estimation performance.

To achieve the aforementioned objective, the present invention provides an orthogonal frequency division multiplexing system for optimizing channel estimation, and the system comprises: a modulation module, arranged for receiving a binary code transmitted from a plurality of transmitting antennas to generate modulation data; a multiplexing module, arranged for receiving the modulation data, dividing the modulation data into a plurality of frequency domain data sequences, and then loading the plurality of frequency domain data sequences to a plurality of sub-carriers to transmit the plurality of sub-carriers, wherein the plurality of sub-carriers are orthogonal to one another; a pilot generating module, arranged for generating a plurality of pilots, and equidistantly disposing the plurality of pilots in the plurality of sub-carriers, and the plurality of pilots are disposed in at least one OFDM symbol; an inverse discrete Fourier transform (IDFT) module, arranged for receiving the plurality of sub-carriers, and performing an inverse discrete Fourier transform (IDFT) to generate transformation data; and a cyclic-delay module, arranged for performing a cyclic-delay procedure on the transformation data to rotate the transformation data on a time domain so as to calculate a cyclic delay thereof, and then the transformation data are transmitted to a receiver to perform the channel estimation and the demodulation performing after the procedure of adding a cyclic prefix; wherein, the pilot generating module divides the plurality of pilots into Q pilot groups, and each of the pilot groups has $N_Q$ pilots, and satisfies the relations of $N_Q \geq L$ and $Q \geq N_T$; and L is a channel length, and $N_T$ is the quantity of transmitting antennas; the plurality of pilots satisfy the relation of $X_{u_{(q,\tau)}}(n_{(q,\tau)}) = \rho/P$; and $Xu(q,\tau)$ is the $\tau^{th}$ pilot in the $q^{th}$ pilot group, $n(q,\tau)$ is a sub-carrier index, P is the total number of pilots, and $\rho$ is the total power of the pilots; the sub-carrier index of the $\tau^{th}$ pilot in the $q^{th}$ sub-carrier satisfies the relation of $n_{(q,\tau)} = t_q + \tau T$, $T = N/N_Q$, $t_q \in \{1, 2, \ldots, T-1\}$; and $t_q$ is an initial sub-carrier index, T is an interval between any two adjacent pilots, and N is the quantity of sub-carriers; a cyclic-delay coefficient and an initial sub-carrier index satisfy the relations of $$t_q \cdot \lambda_q = \frac{N}{P}(q+1) \text{ and } \lambda_q \in \left\{1, 2, \ldots, \left\lfloor \frac{N-1}{(N_T-1) \cdot N_Q} \right\rfloor \right\};$$

and $\lambda q$ is the cyclic-delay coefficient of each of the pilot groups; and the cyclic delay of the $uq^{th}$ OFDM symbol transmitted by the $nT^{th}$ transmitting antenna and calculated by the cyclic-delay module satisfies the relation of $d_{u_q,n_T} = \lambda_q \cdot n_T \cdot N_Q$, such that the channel estimation performance of the receiver is improved.

To achieve the aforementioned objective, the present invention further provides a method for optimizing channel estimation for an orthogonal frequency-division multiplexing system, comprising the steps of: using a modulation module to receive a binary code transmitted by a plurality of transmitting antennas and generate modulation data; using a multiplexing module to receive the modulation data and divide the modulation data into a plurality of frequency domain data sequences, load the plurality of frequency domain data sequences to a plurality of sub-carriers, and transmit the plurality of sub-carriers, wherein the plurality of sub-carriers are orthogonal to one another; using a pilot generating module to divide a plurality of pilots into Q pilot groups, and dispose the plurality of pilots in the plurality of sub-carriers, wherein each of the pilot groups has $N_Q$ pilots and satisfies the relations of: $N_Q \geq L$ and $Q \leq N_T$; and L is a channel length, and $N_T$ is the quantity of transmitting antennas; the plurality of pilots satisfy the relation of $X_{u_{(q,\tau)}}(n_{(q,\tau)})=\rho/P$; and $Xu(q,\tau)$ is the $\tau^{th}$ pilot in the $q^{th}$ pilot group, $n(q,\tau)$ is a sub-carrier index, P is the total number of pilots, and $\rho$ is the total power of the pilots; the sub-carrier index of the $\tau^{th}$ pilot in the $q^{th}$ sub-carrier satisfies the relation of $n_{(q,\tau)}=t_q+\tau T$, $T=N/N_Q$, $t_q \in \{1, 2, \ldots, T-1\}$; and tq is an initial sub-carrier index, T is an interval between any two adjacent pilots, and N is the quantity of sub-carriers; a cyclic-delay coefficient and the first pilot of the plurality of pilots further satisfy the relations of $$t_q \cdot \lambda_q = \frac{N}{P}(q+1) \text{ and } \lambda_q \in \left\{1, 2, \ldots, \left\lfloor \frac{N-1}{(N_T-1) \cdot N_Q} \right\rfloor\right\};$$

and $\lambda q$ is the cyclic-delay coefficient of each of the pilot groups; using an inverse discrete Fourier transform (IDFT) module to receive the plurality of sub-carriers, and perform an inverse discrete Fourier transform (IDFT) to generate transformation data; and using a cyclic-delay module to perform a cyclic-delay procedure on the transformation data to rotate transformation data on a time domain, and calculate a cyclic delay, such that the cyclic delay of the $uq^{th}$ OFDM symbol transmitted by the $nT^{th}$ transmitting antenna and calculated by the cyclic-delay module satisfies the relation of $d_{u_q,n_T}=\lambda_q \cdot n_T \cdot N_Q$; and using a cyclic-delay module to transmit the cyclic prefix to a receiver to perform the channel estimation and the demodulation so as to improve the channel estimation performance of the receiver after the procedure of adding a cyclic prefix.

Preferably, the plurality of pilots may have the same amplitude.

Preferably, each of the pilot groups may correspond to one of the cyclic-delay coefficients.

In a preferred embodiment, the quantity of transmitting antennas may be unequal to the quantity of OFDM symbols.

In a preferred embodiment, the quantity of transmitting antennas may be equal to the quantity of OFDM symbols.

Preferably, all the pilot groups may have the same cyclic-delay coefficients, such that all the pilot groups may be able to be disposed in the same OFDM symbol.

In a preferred embodiment, the OFDM symbols transmitted by the same transmitting antenna may have the same cyclic delay.

In a preferred embodiment, the pilot groups having different cyclic-delay coefficients may be transmitted via different OFDM symbols.

In summation, the orthogonal frequency division multiplexing system for optimizing channel estimation and method for optimizing channel estimation for an orthogonal frequency-division multiplexing system in accordance with the present invention have one or more of the following advantages:

(1) The orthogonal frequency division multiplexing system and method for optimizing channel estimation in accordance with the present invention just require operating the inverse discrete Fourier transform (IDFT) once, so that the computing complexity of the system can be simplified significantly.

(2) The orthogonal frequency division multiplexing system and method for optimizing channel estimation in accordance with the present invention do not have the limitation on having the same quantity of transmitting antennas as the quantity of OFDM symbols, so that the invention provides a better flexibility of the application.

(3) The orthogonal frequency division multiplexing system and method for optimizing channel estimation in accordance with the present invention can be achieved by the operation of simply using one OFDM symbol, so that the invention can reduce the system delay significantly.

DESCRIPTION OF THE PREFERRED EMBODIMENTS

Figure 1:
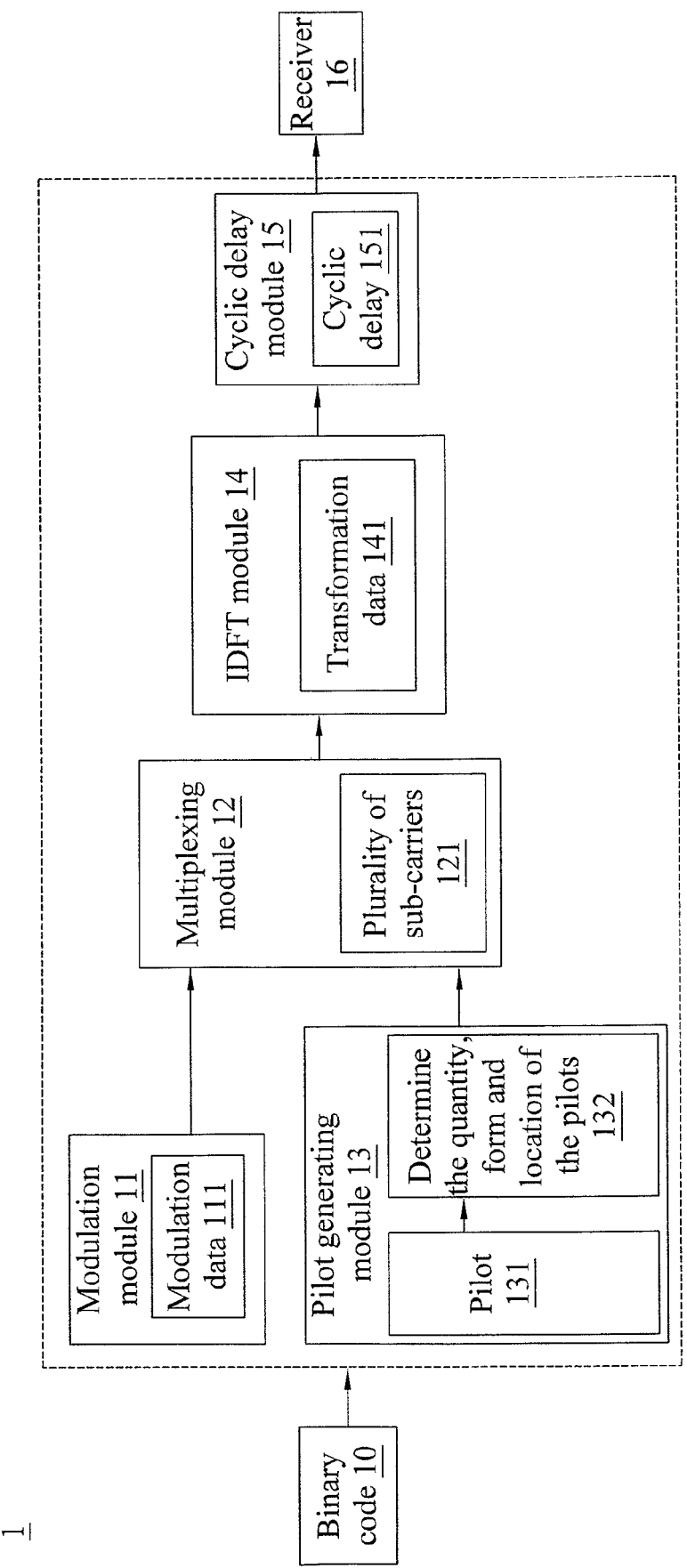
FIG. 1 is a block diagram of an orthogonal frequency division multiplexing system for optimizing channel estimation in accordance with the present invention.

The technical characteristics of the present invention will become apparent with the detailed description of the preferred embodiments accompanied with the illustration of related drawings as follows. It is noteworthy to point out that same numerals are used for representing the same respective elements in the drawings.

With reference to FIG. 1 for a block diagram of an orthogonal frequency division multiplexing system for optimizing channel estimation in accordance with the present invention, the orthogonal frequency division multiplexing system 1 comprises a modulation module 11, a multiplexing module 12, a pilot generating module 13, an inverse discrete Fourier transform (IDFT) module 14 and a cyclic-delay module 15. The modulation module 11 receives a binary code 10 transmitted by a plurality of transmitting antennas and generates modulation data 111. The multiplexing module 12 receives the modulation data 111 and divides the modulation data 111 into a plurality of frequency domain data sequences, and loads a plurality of frequency domain data sequences into a plurality of sub-carriers 121, and transmits the plurality of sub-carriers 121, wherein the plurality of sub-carriers 121 are orthogonal to one another.

The pilot generating module 13 generates a plurality of pilots 131, and determines the quantity, form and location 132 of the pilots 131 to equidistantly dispose the pilots 131 in the plurality of sub-carriers 121, such that the pilots 131 are disposed in at least one OFDM symbol. Firstly, the quantity of pilots is determined. The pilots 131 are divided into Q groups with an equal size, and each group includes $N_Q$ pilots 131 and satisfies the following relations:

$$N_Q \geq L, \text{ and } Q \geq NT \qquad (1)$$

Wherein, L is the channel length, and NT is the quantity of transmitting antennas.

And then, the form of the pilots 131 is determined, and each pilot has the same amplitude and satisfies the following relation:

$$X_{u_{(q,\tau)}}(n_{(q,\tau)}) = \rho/P \qquad (2)$$

Wherein, $Xu(q,\tau)$ is the $\tau^{th}$ pilot in the $q^{th}$ pilot group, $n(q,\tau)$ is a sub-carrier index, P is the total number of pilots, and $\rho$ is the total power of the pilots.

In addition, the location of the pilots 131 is determined, and the sub-carrier index of the $\tau^{th}$ pilot in the $q^{th}$ plurality of sub-carriers satisfies the relations of:

$$n_{(q,\tau)} = t_q + \tau T \text{ and } T = N/N_Q, \ t_q \in \{1, 2, \ldots, T-1\} \qquad (3)$$

Wherein, tq is an initial sub-carrier index, T is an interval between any two adjacent pilots, and N is the quantity of sub-carriers.

A cyclic-delay coefficient of each pilot group and the initial sub-carrier index satisfy the following relations:

$$t_q \cdot \lambda_q = \frac{N}{P}(q+1) \text{ and } \lambda_q \in \left\{1, 2, \ldots, \left\lfloor \frac{N-1}{(N_T-1) \cdot N_Q} \right\rfloor\right\} \qquad (4)$$

Wherein, $\lambda q$ is the cyclic-delay coefficient of each pilot group.

Since each pilot group corresponds to a cyclic-delay coefficient, therefore the location of the pilots 131 can be to determine the cyclic-delay coefficient corresponding to each pilot group, and the value of the cyclic delay 151 can be calculated. In addition, the pilot group having different cyclic-delay coefficients needs to be transmitted by using different OFDM symbols.

The inverse discrete Fourier transform (IDFT) module 14 receives a plurality of sub-carriers and performs an inverse discrete Fourier transform (IDFT) to generate transformation data 141.

The cyclic-delay module 15 performs a cyclic-delay procedure on the transformation data 141 to rotate the transformation data 141 on a time domain, and calculates a cyclic delay 151, and then the transformation data 141 will be transmitted to the receiver 16 to perform the channel estimation and the demodulation after the procedure of adding a cyclic prefix. The cyclic delay of the $uq^{th}$ OFDM symbol transmitted by the $nT^{th}$ transmitting antenna and calculated by the cyclic-delay module satisfies the relation of:

$$d_{u_q, n_T} = \lambda_q \cdot n_T \cdot N_Q \qquad (5)$$

The OFDM symbol transmitted by the same transmitting antenna have the same cyclic delay.

The aforementioned pilot design method can minimize the mean square error (MSE) of the least square (LS) channel estimation and the minimum mean square error (MMSE) channel estimation, so optimal channel estimation performance can be achieved.

It is noteworthy that the pilot design method of the present invention does not have the limitation of having the quantity of transmitting antennas equal to the quantity of OFDM symbols. In the method of the present invention, the quantity of transmitting antennas can be equal or unequal to the quantity of OFDM symbols. Compared with the prior art, the application of the present invention has better flexibility. The present invention makes each pilot group have the same cyclic-delay coefficient, such that the pilots can be disposed in the same OFDM symbol, and thus reducing the delay of the system significantly, and thus the present invention improves over the prior art.

Figure 2:
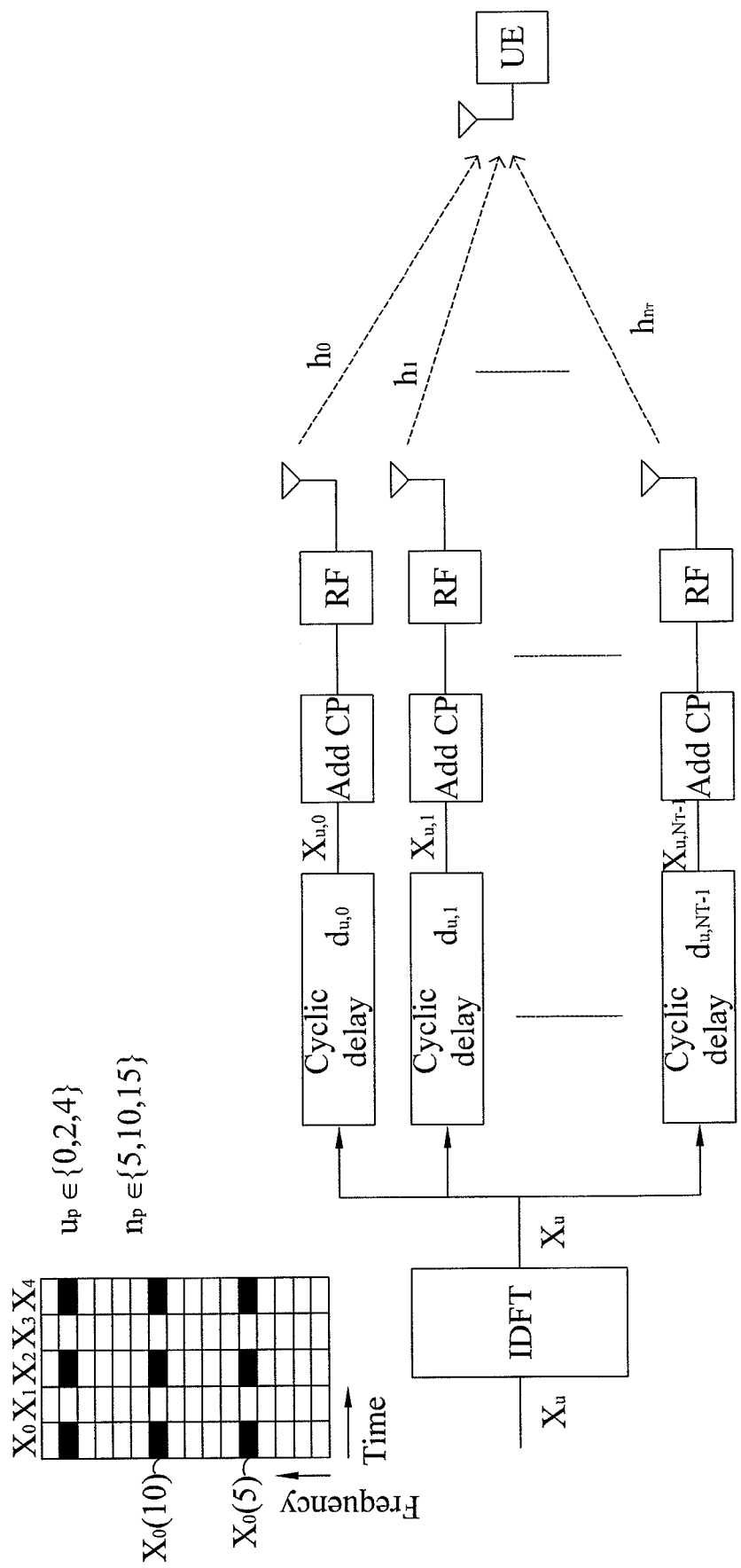
FIG. 2 is a schematic view of an orthogonal frequency division multiplexing system for optimizing channel estimation in accordance with a first preferred embodiment of the present invention.

With reference to FIG. 2 for a schematic view of an orthogonal frequency division multiplexing system for optimizing channel estimation in accordance with the first preferred embodiment of the present invention, the method of disposing the pilots in accordance with the present invention is described. The method of the present invention equidistantly disposes the pilots on the sub-carriers, and makes each pilot have the same amplitude. In FIG. 2, 9 pilots are disposed in the OFDM symbols 0, 2, 4 in three sub-carriers 5, 10, 15. However, the aforementioned method of disposing the pilots is provided for the purpose of illustrating the invention only, but the invention is not limited to such method only.

Figure 3:
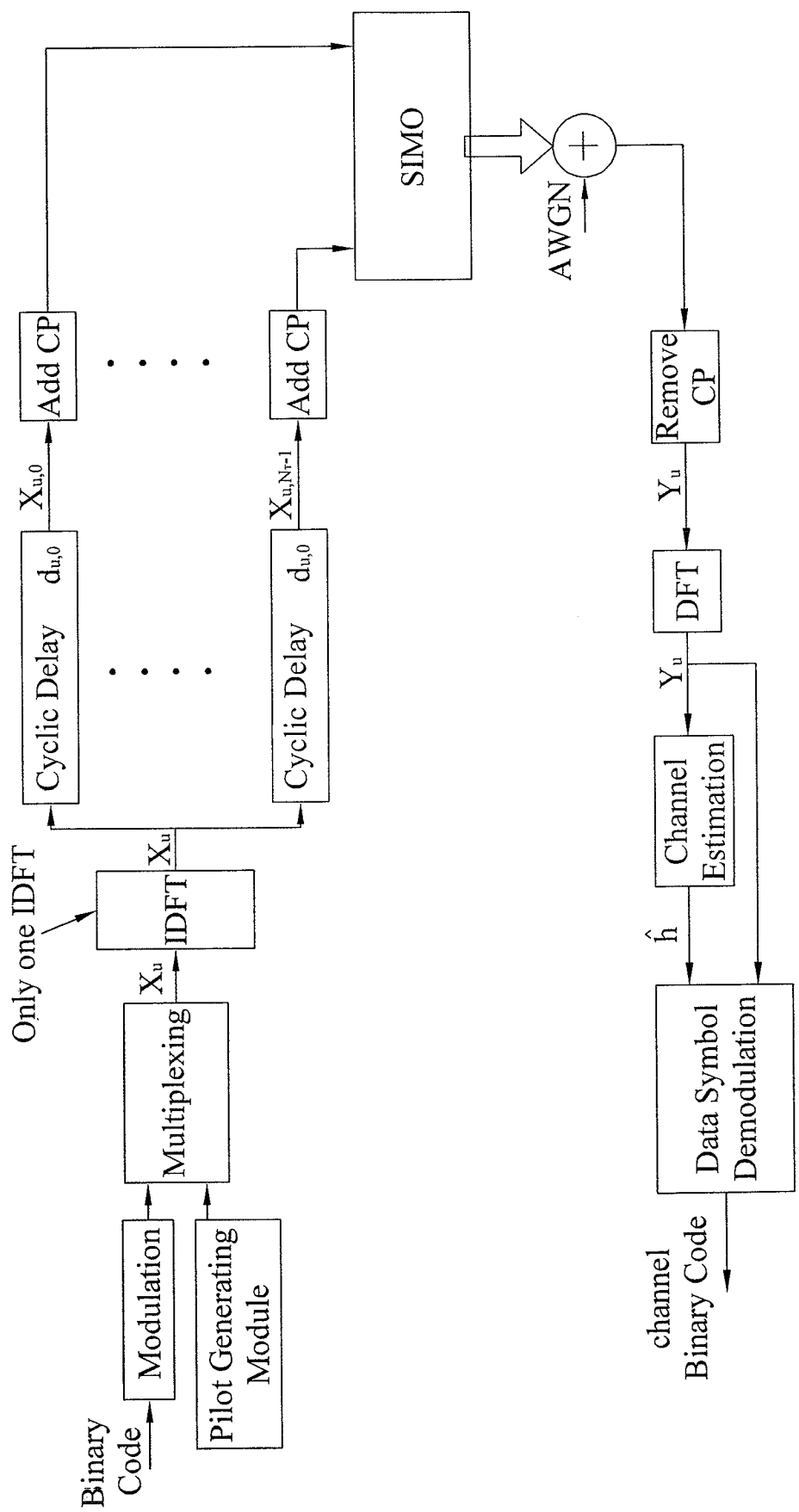
FIG. 3 is a schematic view of an orthogonal frequency division multiplexing system for optimizing channel estimation in accordance with a second preferred embodiment of the present invention.

With reference to FIG. 3 for a schematic view of an orthogonal frequency division multiplexing system for optimizing channel estimation in accordance with the second preferred embodiment of the present invention, the method of designing he pilots in accordance with the present invention is applied in a cyclic-delay diversity orthogonal frequency division multiplexing (CDD-OFDM) system. This system only requires operating the inverse discrete Fourier transform (IDFT) once at the receiver.

Firstly, the binary code is modulated, and then a multiplexing procedure is performed. Now, the pilot generating module designs the quantity, form and location of the pilots according to the aforementioned method, and then disposes all the pilot in one OFDM symbol. The data produced after the multiplexing procedure is processed by a cyclic-delay procedure, so that the value of each cyclic delay matches a certain specific form. And then, the data are transmitted to the receiver after the procedure of adding a cyclic prefix to perform a channel estimation and a demodulation, so as to optimize the channel estimation of the system. Of course, the method of the present invention can further use a plurality of OFDM symbols to transmit the pilots, so that the application can be more flexible. In addition, the method of the present invention can transmit the pilots by using only one OFDM symbol to reduce the delay of the system significantly.

Figure 4:
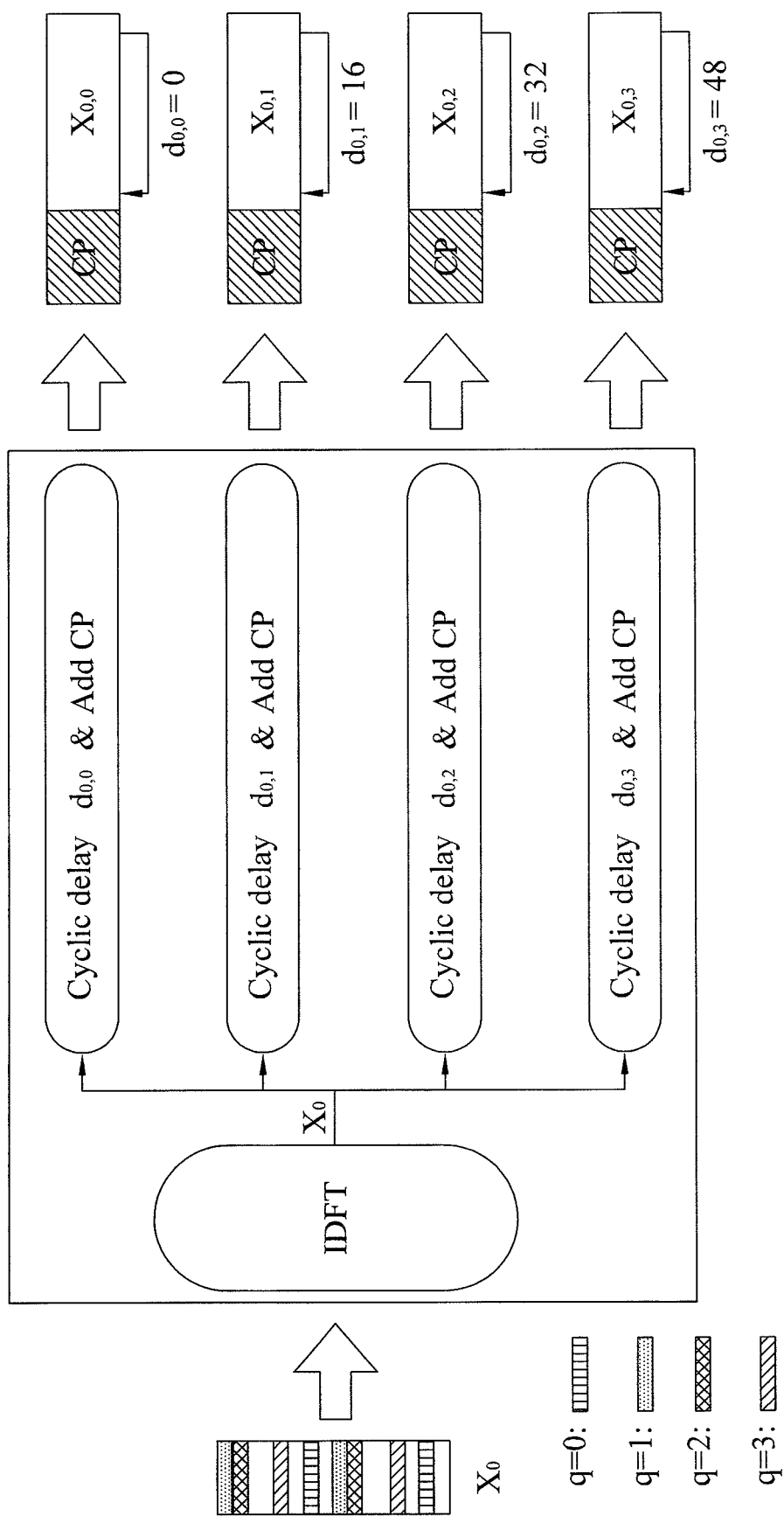
FIG. 4 is a schematic view of an orthogonal frequency division multiplexing system for optimizing channel estimation in accordance with a third preferred embodiment of the present invention.
Figure 5:
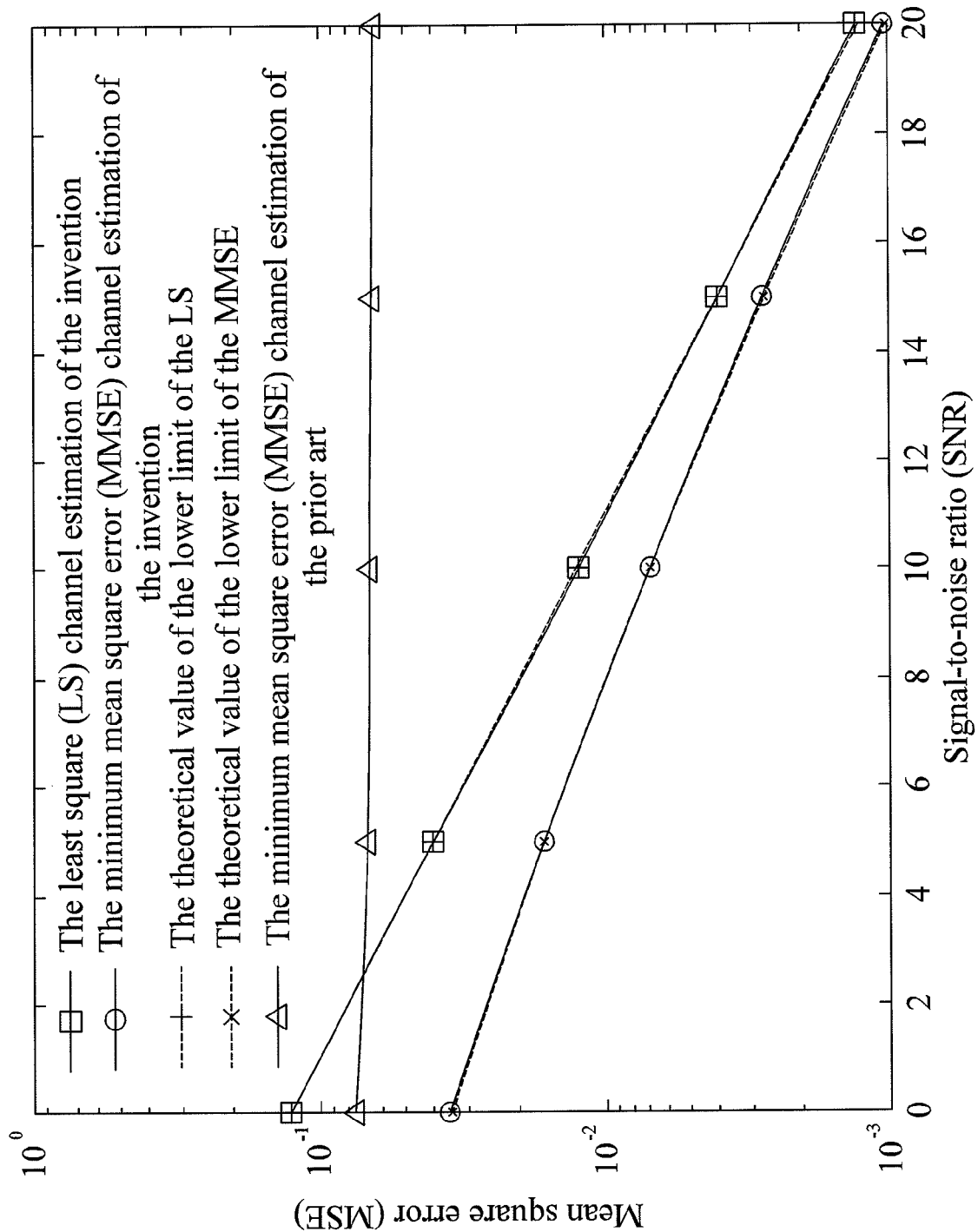
FIG. 5 is a schematic view of simulation results of an orthogonal frequency division multiplexing system for optimizing channel estimation in accordance with the third preferred embodiment of the present invention.

With reference to FIGS. 4 and 5 for schematic view of an orthogonal frequency division multiplexing system for optimizing channel estimation and a simulation result of the orthogonal frequency division multiplexing system for optimizing channel estimation in accordance with the third preferred embodiment of the present invention respectively, all pilots are disposed in one OFDM symbol, and the quantity of antennas is equal to 4, and the pilots are divided into 4 groups, and each group has 8 pilots. In the figures, each of the obtained cyclic delays is $d_{n_T} = 15 \cdot n_T(0, 16, 32 \text{ and } 48)$, wherein $d_{n_T}$ is the cyclic delay of the OFDM symbol transmitted by the $nT^{th}$ transmitting antenna, and each sub-carrier index of this preferred embodiment is listed in Table 1.

TABLE 1

| $n_{(0,0)}$ | $n_{(0,1)}$ | $n_{(0,2)}$ | $n_{(0,3)}$ | $n_{(0,4)}$ | $n_{(0,5)}$ | $n_{(0,6)}$ | $n_{(0,7)}$ |
|---|---|---|---|---|---|---|---|
| 2 | 18 | 34 | 50 | 66 | 82 | 98 | 114 |
| $n_{(1,0)}$ | $n_{(1,1)}$ | $n_{(1,2)}$ | $n_{(1,3)}$ | $n_{(1,4)}$ | $n_{(1,5)}$ | $n_{(1,6)}$ | $n_{(1,7)}$ |
| 4 | 20 | 36 | 52 | 68 | 84 | 100 | 116 |
| $n_{(2,0)}$ | $n_{(2,1)}$ | $n_{(2,2)}$ | $n_{(2,3)}$ | $n_{(2,4)}$ | $n_{(2,5)}$ | $n_{(2,6)}$ | $n_{(2,7)}$ |
| 6 | 22 | 38 | 54 | 70 | 86 | 102 | 118 |
| $n_{(3,0)}$ | $n_{(3,1)}$ | $n_{(3,2)}$ | $n_{(3,3)}$ | $n_{(3,4)}$ | $n_{(3,5)}$ | $n_{(3,6)}$ | $n_{(3,7)}$ |
| 8 | 24 | 40 | 56 | 72 | 88 | 104 | 120 |

In FIG. 5, the method of the present invention used for designing the sequence of the pilot can achieve a lower limit of the mean square error (MSE) of the least square channel estimation and the minimum mean square error (MMSE) channel estimation, so the channel estimation performance can be optimized. In FIG. 5, the method of the present invention can have a lower limit of the mean square error (MSE) lower than that of the traditional method of partitioning the pilot sequences, but can have a higher signal-to-noise ratio (SNR). The aforementioned results are obtained under the condition of having the quantity of pilots equal to 32.

Figure 6:
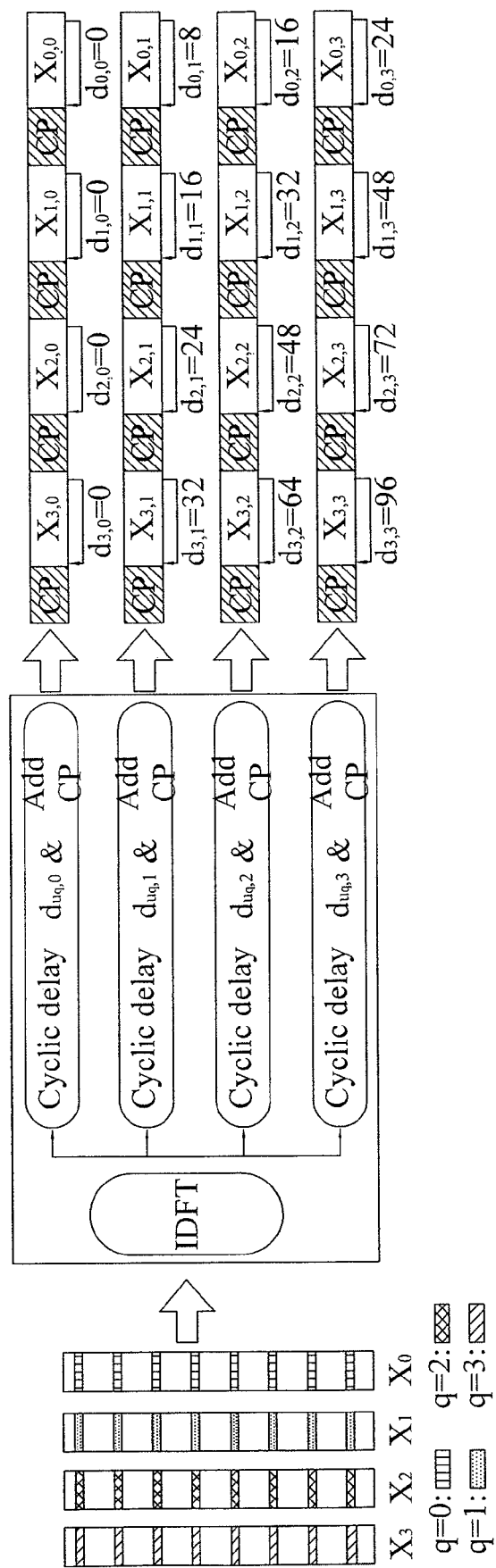
FIG. 6 is a schematic view of an orthogonal frequency division multiplexing system for optimizing channel estimation in accordance with a fourth preferred embodiment of the present invention.

With reference to FIG. 6 for a schematic view of an orthogonal frequency division multiplexing system for optimizing channel estimation in accordance with the fourth preferred embodiment of the present invention, the pilots are disposed in four OFDM symbols, and the quantity of antennas is equal to 4, and the pilots are divided into 4 groups, each group has 8 pilots. In FIG. 6, each pilot group has different sub-carrier indexes and cyclic delays. In the pilot group q=0, 2, the initial sub-carrier index is set to 4; and in the pilot group q=1, 3, the initial sub-carrier index is set to 8.

According to Equation (3), the sub-carrier index corresponding to the pilot group q=0, 2 is equal to {4, 20, 36, 52, 68, 84, 100, 116}; and the sub-carrier index corresponding to the pilot group q=0, 2 is equal to {4, 20, 36, 52, 68, 84, 100, 116}. According to Equation (4), the cyclic-delay coefficient of the pilot group q=0, 1, 3, 4 is equal to {1, 1, 3, 2}. According to Equation (5), the cyclic delay of the pilot group q=0, 1, 3, 4 is equal to {8nT, 8n, 24n, 16n}. Therefore, the first and second pilot groups (q=0, 1) can be placed in the same OFDM symbol for the transmission. In addition, these four pilot groups can be placed into three OFDM symbols.

Even though the concept of the method for optimizing channel estimation for an orthogonal frequency-division multiplexing system of the present invention has been described in the section of the orthogonal frequency division multiplexing system for optimizing channel estimation of the present invention, the following flow chart is provided for illustrating the invention more clearly.

Figure 7:
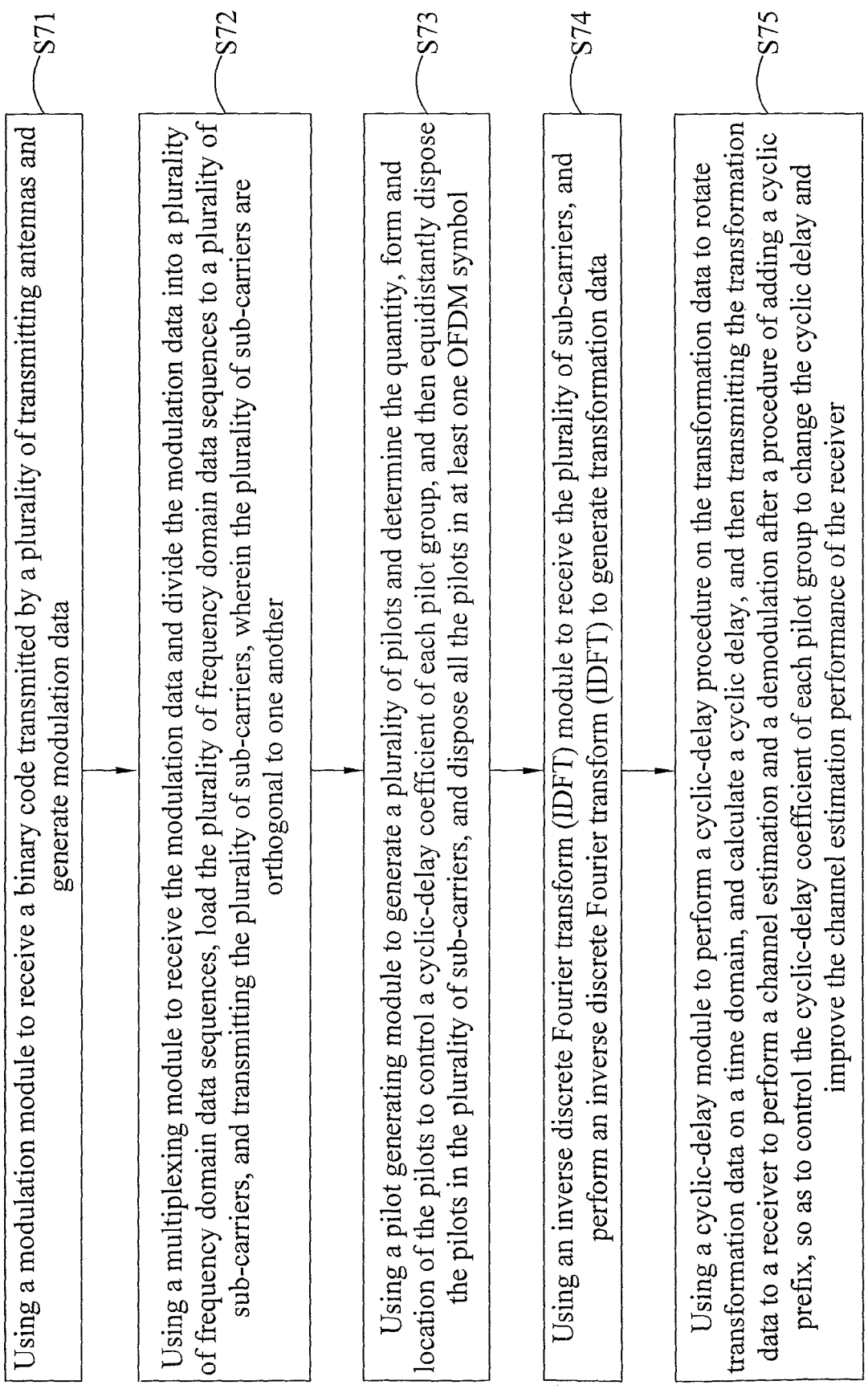
FIG. 7 is a flow chart of a method for optimizing channel estimation for an orthogonal frequency-division multiplexing system in accordance with the present invention.

With reference to FIG. 7 for a flow chart of a method for optimizing channel estimation for an orthogonal frequency-division multiplexing system in accordance with the present invention, the method comprises the following steps.

S71: Using a modulation module to receive a binary code transmitted by a plurality of transmitting antennas and generate modulation data.

S72: Using a multiplexing module to receive the modulation data and divide the modulation data into a plurality of frequency domain data sequences, load the plurality of frequency domain data sequences to a plurality of sub-carriers, and transmitting the plurality of sub-carriers, wherein the plurality of sub-carriers are orthogonal to one another.

S73: Using a pilot generating module to generate a plurality of pilots and determine the quantity, form and location of the pilots to control a cyclic-delay coefficient of each pilot group, and then equidistantly dispose the pilots in the plurality of sub-carriers, and dispose all the pilots in at least one OFDM symbol.

S74: Using an inverse discrete Fourier transform (IDFT) module to receive the plurality of sub-carriers, and perform an inverse discrete Fourier transform (IDFT) to generate transformation data.

S75: Using a cyclic-delay module to perform a cyclic-delay procedure on the transformation data to rotate transformation data on a time domain, and calculate a cyclic delay, and then transmitting the transformation data to a receiver to perform a channel estimation and a demodulation after a procedure of adding a cyclic prefix, so as to control the cyclic-delay coefficient of each pilot group to change the cyclic delay and improve the channel estimation performance of the receiver.

The details and implementation method of the method for optimizing channel estimation for an orthogonal frequency-division multiplexing system of the present invention have been described in the section of the orthogonal frequency division multiplexing system for optimizing channel estimation of the present invention already, and thus will not be repeated.

The orthogonal frequency division multiplexing system and method for optimizing channel estimation in accordance with the present invention just require operating the inverse discrete Fourier transform (IDFT) once, so that the computing complexity of the system can be simplified significantly. The invention does not have the limitation on having the same quantity of transmitting antennas as the quantity of OFDM symbols, so that the invention provides a better flexibility of the application. The invention can be achieved by the operation of simply using one OFDM symbol, so that the invention can reduce the system delay significantly.

In summation of the description above, the present invention breaks through the prior, achieves the expected effects, and complies with the patent application requirements, and thus is duly filed for patent application. While the invention has been described by means of specific embodiments, numerous modifications and variations could be made thereto by those skilled in the art without departing from the scope and spirit of the invention set forth in the claims.

What is claimed is:

1. An orthogonal frequency division multiplexing system capable of optimizing channel estimation, comprising:
    a modulation module, arranged for receiving a binary code transmitted from a plurality of transmitting antennas to generate modulation data;
    a multiplexing module, arranged for receiving the modulation data, dividing the modulation data into a plurality of frequency domain data sequences, and then loading the plurality of the frequency domain data sequences to a plurality of sub-carriers to transmit the plurality of the sub-carriers, wherein the plurality of the sub-carriers are orthogonal to one another;
    a pilot generating module, arranged for generating a plurality of pilots, and the plurality of the pilots being equidistantly disposed in the plurality of the sub-carriers, and the plurality of the pilots being disposed in at least one OFDM symbol;
    an inverse discrete Fourier transform (IDFT) module, arranged for receiving the plurality of the sub-carriers, and performing an inverse discrete Fourier transform (IDFT) to generate transformation data; and
    a cyclic-delay module, arranged for performing a cyclic-delay procedure on the transformation data to rotate the transformation data on a time domain so as to calculate a cyclic delay thereof, and then the transformation data being transmitted to a receiver to perform a channel estimation and a demodulation after a procedure of adding a cyclic prefix; wherein, the pilot generating module divides the plurality of the pilots into Q pilot groups, and each of the pilot groups has $N_Q$ pilots, and satisfies the relations of:

$N_Q \geq L$ and $Q \geq N_T$, wherein L is a channel length, and $N_T$ is the quantity of transmitting antennas;

the plurality of the pilots satisfying the relation of:

$X_{u_{(q,\tau)}}(n_{(q,\tau)}) = \rho/P$, wherein $Xu(q,\tau)$ is the $\tau^{th}$ pilot in the $q^{th}$ pilot group, $n(q,\tau)$ is a sub-carrier index, P is the total number of the pilots, and $\rho$ is the total power of the pilots;

the sub-carrier index of the $\tau^{th}$ pilot in the $q^{th}$ sub-carrier satisfying the relation of:

$n_{(q,\tau)} = t_q + \tau T$, $T = N/N_Q$, $t_q \in \{1, 2, \ldots, T-1\}$, wherein tq is an initial sub-carrier index, T is an interval between any two adjacent pilots, and N is the quantity of sub-carriers;

a cyclic-delay coefficient and an initial sub-carrier index satisfying the relations of:

$$t_q \cdot \lambda_q = \frac{N}{P}(q+1) \text{ and } \lambda_q \in \left\{1, 2, \ldots, \left\lfloor \frac{N-1}{(N_T-1) \cdot N_Q} \right\rfloor\right\},$$

wherein $\lambda q$
is the cyclic-delay coefficient of each of the pilot groups;
the cyclic delay of the $uq^{th}$ OFDM symbol transmitted by the $nT^{th}$ transmitting antenna and calculated by the cyclic-delay module satisfying the relation of:

$d_{u_q,n_T} = \lambda_q \cdot n_T \cdot N_Q$, such that the channel estimation performance of the receiver is improved.

2. The orthogonal frequency division multiplexing system of claim 1, wherein the plurality of the pilots have the same amplitude.

3. The orthogonal frequency division multiplexing system of claim 1, wherein each of the pilot groups corresponds to a specific cyclic-delay coefficient.

4. The orthogonal frequency division multiplexing system of claim 1, wherein the quantity of the transmitting antennas is unequal to the quantity of the OFDM symbols.

5. The orthogonal frequency division multiplexing system of claim 1, wherein the quantity of the transmitting antennas is equal to the quantity of the OFDM symbols.

6. The orthogonal frequency division multiplexing system of claim 1, wherein all the pilot groups have the same cyclic-delay coefficient, such that all the pilot groups are able to be arranged in the same OFDM symbol.

7. The orthogonal frequency division multiplexing system of claim 1, wherein all the OFDM symbols transmitted by the same transmitting antenna have the same cyclic-delay.

8. The orthogonal frequency division multiplexing system of claim 1, wherein the pilot groups having different cyclic-delay coefficients are transmitted via different OFDM symbols.

9. A method for optimizing a channel estimation for an orthogonal frequency-division multiplexing system, comprising the steps of:

using a modulation module to receive a binary code transmitted by a plurality of transmitting antennas and generate modulation data;

using a multiplexing module to receive the modulation data and divide the modulation data into a plurality of frequency domain data sequences, and then load the plurality of the frequency domain data sequences to a plurality of sub-carriers, and transmit the plurality of the sub-carriers, wherein the plurality of the sub-carriers are orthogonal to one another;

using a pilot generating module to divide a plurality of pilots into Q pilot groups, and dispose the plurality of the pilots in the plurality of the sub-carriers, wherein each of the pilot groups has $N_Q$ pilots and satisfies the relations of:

$N_Q \geq L$ and $Q \geq N_T$, wherein L is a channel length, and $N_T$ is the quantity of transmitting antennas;

wherein the plurality of pilots satisfies the relation of:

$X_{u_{(q,\tau)}}(n_{(q,\tau)}) = \rho/P$, wherein $Xu(q,\tau)$ is the $\tau^{th}$ pilot in the $q^{th}$ pilot group, $n(q,\tau)$ is a sub-carrier index, P is the total number of the pilots, and $\rho$ is the total power of the pilots;

wherein, the sub-carrier index of the $\tau^{th}$ pilot in the $q^{th}$ plurality of sub-carriers satisfies the relation of:

$n_{(q,\tau)} = t_q + \tau T$, $T = N/N_Q$, $t_q \in \{1, 2, \ldots, T-1\}$, wherein tq is an initial sub-carrier index, T is an interval between two pilots, and N is the quantity of sub-carriers;

wherein a cyclic-delay coefficient and the first pilot of the plurality of pilots further satisfies the relations of:

$$t_q \cdot \lambda_q = \frac{N}{P}(q+1) \text{ and } \lambda_q \in \left\{1, 2, \ldots, \left\lfloor \frac{N-1}{(N_T-1) \cdot N_Q} \right\rfloor\right\},$$

wherein $\lambda q$ is the cyclic-delay coefficient of each of the pilot groups;

using an inverse discrete Fourier transform (IDFT) module to receive the plurality of the sub-carriers, and perform an inverse discrete Fourier transform (IDFT) to generate transformation data; and using a cyclic-delay module to perform a cyclic-delay procedure on the transformation data to rotate the transformation data on a time domain, and calculate a cyclic delay, such that the cyclic delay of the uqth OFDM symbol transmitted by the nTth transmitting antenna and calculated by the cyclic-delay module satisfies the relation of:

$d_{u_q,n_T} = \lambda_q \cdot n_T \cdot N_Q$; using a cyclic-delay module to transmit the cyclic prefix to a receiver to perform a channel estimation and a demodulation so as to improve the channel estimation performance of the receiver after a procedure of adding a cyclic prefix.

10. The method of claim 9, wherein the plurality of the pilots have the same amplitude.

11. The method of claim 9, wherein each of the pilot groups corresponds to a specific cyclic-delay coefficient.

12. The method of claim 9, wherein the quantity of the transmitting antennas is unequal to the quantity of the OFDM symbols.

13. The method of claim 9, wherein the quantity of the transmitting antennas is equal to the quantity of the OFDM symbols.

14. The method of claim 9, wherein all the pilot groups have the same cyclic-delay coefficients, such that all the pilot groups are able to be disposed in the same OFDM symbol.

15. The method of claim 9, wherein the OFDM symbols transmitted by the same transmitting antenna have the same cyclic delay.

16. The method of claim 9, wherein the pilot groups having different cyclic-delay coefficients are transmitted via different OFDM symbols.

* * * * *